United States Patent
Yamada et al.

(10) Patent No.: US 7,624,020 B2
(45) Date of Patent: Nov. 24, 2009

(54) ADAPTER FOR ALLOWING BOTH ONLINE AND OFFLINE TRAINING OF A TEXT TO TEXT SYSTEM

(75) Inventors: Kenji Yamada, Los Angeles, CA (US); Kevin Knight, Hermosa Beach, CA (US); Greg Langmead, Playa del Rey, CA (US)

(73) Assignee: Language Weaver, Inc., Marina del Rey, CA (US)

( * ) Notice: Subject to any disclaimer, the term of this patent is extended or adjusted under 35 U.S.C. 154(b) by 276 days.

(21) Appl. No.: 11/223,823

(22) Filed: Sep. 9, 2005

(65) Prior Publication Data

US 2007/0094169 A1    Apr. 26, 2007

(51) Int. Cl.
  G06F 17/28  (2006.01)
  G10L 15/00  (2006.01)
  G10L 13/00  (2006.01)
  G10L 21/00  (2006.01)
  G06E 1/00  (2006.01)

(52) U.S. Cl. ............... 704/277; 704/8; 704/237; 704/256.2; 704/258; 706/15

(58) Field of Classification Search ............... 706/15, 706/10; 704/8, 237, 256.2, 258, 277
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,787,038 A | 11/1988 | Doi et al. |
| 4,814,987 A | 3/1989 | Miyao et al. |
| 4,942,526 A | 7/1990 | Okajima et al. |
| 5,146,405 A | 9/1992 | Church |
| 5,181,163 A | 1/1993 | Nakajima et al. |
| 5,212,730 A | 5/1993 | Wheatley et al. |
| 5,267,156 A | 11/1993 | Nomiyama |
| 5,311,429 A | 5/1994 | Tominaga |
| 5,432,948 A | 7/1995 | Davis et al. |
| 5,477,451 A | 12/1995 | Brown et al. |
| 5,497,319 A | 3/1996 | Chong et al. |
| 5,510,981 A | 4/1996 | Berger et al. |

(Continued)

FOREIGN PATENT DOCUMENTS

EP    0469884 A2    2/1992

(Continued)

OTHER PUBLICATIONS

Yamada-K., "A Syntax-Basaed Statistical Translation Model" 2002 PhD Disseration pp. 1-141.*

(Continued)

*Primary Examiner*—Albert DeCady
*Assistant Examiner*—Thomas H Stevens
(74) *Attorney, Agent, or Firm*—Carr & Ferrell LLP

(57) ABSTRACT

An adapter for a text to text training. A main corpus is used for training, and a domain specific corpus is used to adapt the main corpus according to the training information in the domain specific corpus. The adaptation is carried out using a technique that may be faster than the main training. The parameter set from the main training is adapted using the domain specific part.

24 Claims, 1 Drawing Sheet

U.S. PATENT DOCUMENTS

| | | | |
|---|---|---|---|
| 5,644,774 A | 7/1997 | Fukumochi et al. | |
| 5,696,980 A | 12/1997 | Brew | |
| 5,724,593 A | 3/1998 | Hargrave, III et al. | |
| 5,761,631 A | 6/1998 | Nasukawa | |
| 5,781,884 A | 7/1998 | Pereira et al. | |
| 5,805,832 A | 9/1998 | Brown et al. | |
| 5,848,385 A | 12/1998 | Poznanski et al. | |
| 5,867,811 A | 2/1999 | O'Donoghue | |
| 5,870,706 A | 2/1999 | Alshawi | |
| 5,903,858 A | 5/1999 | Saraki | |
| 5,987,404 A | 11/1999 | Della Pietra et al. | |
| 5,991,710 A | 11/1999 | Papineni et al. | |
| 6,031,984 A | 2/2000 | Walser | |
| 6,032,111 A | 2/2000 | Mohri | |
| 6,092,034 A | 7/2000 | McCarley et al. | |
| 6,119,077 A | 9/2000 | Shinozaki | |
| 6,131,082 A | 10/2000 | Hargrave, III et al. | |
| 6,182,014 B1 | 1/2001 | Kenyon et al. | |
| 6,205,456 B1 | 3/2001 | Nakao | |
| 6,223,150 B1 | 4/2001 | Duan et al. | |
| 6,236,958 B1 | 5/2001 | Lange et al. | |
| 6,269,351 B1* | 7/2001 | Black | 706/15 |
| 6,278,967 B1 | 8/2001 | Akers et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,502,064 B1 | 12/2002 | Miyahira et al. | |
| 6,782,356 B1 | 8/2004 | Lopke | |
| 6,810,374 B2 | 10/2004 | Kang | |
| 6,901,361 B1* | 5/2005 | Portilla | 704/8 |
| 6,904,402 B1 | 6/2005 | Wang et al. | |
| 6,999,925 B2* | 2/2006 | Fischer et al. | 704/243 |
| 7,107,215 B2 | 9/2006 | Ghali | |
| 7,113,903 B1 | 9/2006 | Riccardi et al. | |
| 7,383,542 B2 | 6/2008 | Richardson et al. | |
| 2002/0188438 A1 | 12/2002 | Knight et al. | |
| 2002/0198701 A1 | 12/2002 | Moore | |
| 2004/0030551 A1 | 2/2004 | Marcu et al. | |
| 2006/0015323 A1* | 1/2006 | Udupa et al. | 704/9 |

FOREIGN PATENT DOCUMENTS

| | | |
|---|---|---|
| EP | 0715265 A2 | 6/1996 |
| EP | 0933712 A2 | 8/1999 |
| JP | 07244666 | 1/1995 |
| JP | 07244666 | 9/1995 |
| JP | 10011447 | 1/1998 |
| JP | 11272672 | 10/1999 |

OTHER PUBLICATIONS

Al-Onaizan et al., "Translation with Scare Resources" 2000 Univ of Southern Calif pp. 1-7.*

Soricut et al., "Using a Large Monoligual Corpus to Improve Translation Accuracy" 2002 Univ of Southern Calif pp. 155-164.*

Imamura et al., "Feedback Cleaning of Machine Translation Rules Using Automatic Evaluation" 2003 Computational Linguistics pp-447-454.*

Lee-Y.S.,"Neural Network Approach to Adaptive Learning: with an Application to Chinese Homophone Disambiguation", IEEE p. 1521-1526.*

Rayner et al.,"Hybrid Language Processing in the Spoken Language Translator" IEEE p. 107-110.*

Rogati et al.,"Resource Selection for Domain-Specific Cross-Lingual IR" ACM 2004 p. 154-161.*

Abney, Stephen, "Parsing By Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

AlShawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop Tag+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle, pp. 1-8.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. Of 7th Int'l Cont. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5, pp. 1-27.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO), pp. 1-9.

Elhadad, M. and Robin, J., "An Overview of Surge: a Reusable Comprehensive Syntactic Realization Component," 1996, Technical Report 96-03, Department of Mathematics and Computer Science, Ben Gurion University, Beer Sheva, Israel, pp. 1-10.

Elhadad, M. and Robin, J., "Controlling Content Realization with Functional Unification Grammars", Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel, pp. 1-156.

Elhadad. M. and Robin, J., "Surge: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Vee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation",2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer London, UK, pp. 1-12.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo, pp. 1-8.

Jelinek F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel), pp. 1-9.

Knight, Kevin, "A Statistical MT Tutorial Workbook," 1999, JHU Summer Workshop (available at http://www.isi.edu/natural-languae/mt/wkbk.rtf), pp. 1-35.

Knight, Kevin, "Automating Knowledge Acquisition for Machine Translation," 1997, Al Magazine 18(4).

Knight, K. and Chander, I., "Automated Postediting of Documents,"1994, Proc. of the 12th Conference on Artificial Intelligence, pp. 779-784, pp. 1-24.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4, pp. 134-141.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain, pp. 1-8.

Knight, K. et al., "Machine Transliteration of Names in Arabic Text," 2002, Proc. of the ACL Workshop on Computational Approaches to Semitic Languages, pp. 1-13.

Knight, K. and Marcu, D., "Statistics-Based Summarization—Step One: Sentence Compression," 2000, American Association for Artificial Intelligence Conference, pp. 703-710.

Knight, K. et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1, pp. 1-32.

Koehn, P. and Knight, K., "ChunkMT: Statistical Machine Translation with Richer Linguistic Knowledge," Apr. 2002, Information Sciences Institution, pp. 1-9.

Koehn, P. and Knight, K., "Estimating Word Translation Probabilities from Unrelated Monolingual Corpora Using the EM Algorithm," 2000, Proc. of the 17th meeting of the AAAI, pp. 1-5.

Koehn, P. and Knight, K., "Knowledge Sources for Word-Level Translation Models," 2001, Conference on Empirical Methods in Natural Language Processing, pp. 1-9.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc, 2nd Int'l Natural Language Generation Conference, pp. 1-171.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted], pp. 1-22.

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto, pp. 1-351.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evauation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents], pp. 1-2.

Meng et al., "Generating Phonetic Cognates to Handle Named Entitles in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al, "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen,S.and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(WO102-022), pp. 1-10.

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York, pp. 1-374.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language, pp. 1-8.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on FIfth Generation Computer Systems, vol. 2, pp. 1133-1140.

Taylor et al., "The Penn Treebank: An Overview," in A. AbelII (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001 Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Toyko, Japan.

Yarowsky, David, "Unsupervised Word Sense Disambiguation Rivaling Supervised Methods," 1995, 33rd Annual Meeting of the ACL, pp. 189-196.

Callan et al., "Trec and Tipster Experiments with Inquery," 1994, Information Processing and Management, vol. 31, Issue 3, pp. 327-343.

Cohen, Yossi, "Interpreter for FUF," (available at ftp://ftp.cs.bgu.ac.il/ pub/people/elhadad/fuf-life.lf), pp. 1-21.

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents], pp. 1-8.

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

Knight, Kevin, "Integrating Knowledge Acquisition and Language Acquisition", May 1992, Journal of Applied Intelligence, vol. 1, No. 4, 20 pages.

* cited by examiner

ADAPTER FOR ALLOWING BOTH ONLINE AND OFFLINE TRAINING OF A TEXT TO TEXT SYSTEM

BACKGROUND

Text-to-text applications, such as machine translation systems, often operate based on training data. A machine translation system may automatically learn from translated documents. The quality of the actual translation is based on the amount and quality of the data, and the precision of the training process. The processing uses a tradeoff between the data quality and the speed of processing.

Machine translation systems learn from language pairs, and thereafter may translate documents from one language in the pair to the other language in the pair. Translation quality may be greatly improved by providing field specific translation information, that is, translation information that is specific to the field of the information that is being translated.

SUMMARY

The present application teaches a system which allows a generic training to be done by the translation developer. The translation developer can use a slow but accurate training technique for that generic training. A text to text application system may be done in two parts, generic training done first, with emphasis on accuracy, followed by specific training done with emphasis on speed. The data from the specific training is used to "adapt" the data created by the generic training.

The system may be provided to the customer with the generic training already completed. The field—specific training can be done by the customer, as part of a customization process for the translation. The field specific training uses a technique that is faster but less accurate than the generic training.

Techniques are disclosed for the faster training techniques, and for merging the two training parts without completely re-training.

DETAILED DESCRIPTION

Figure 1:
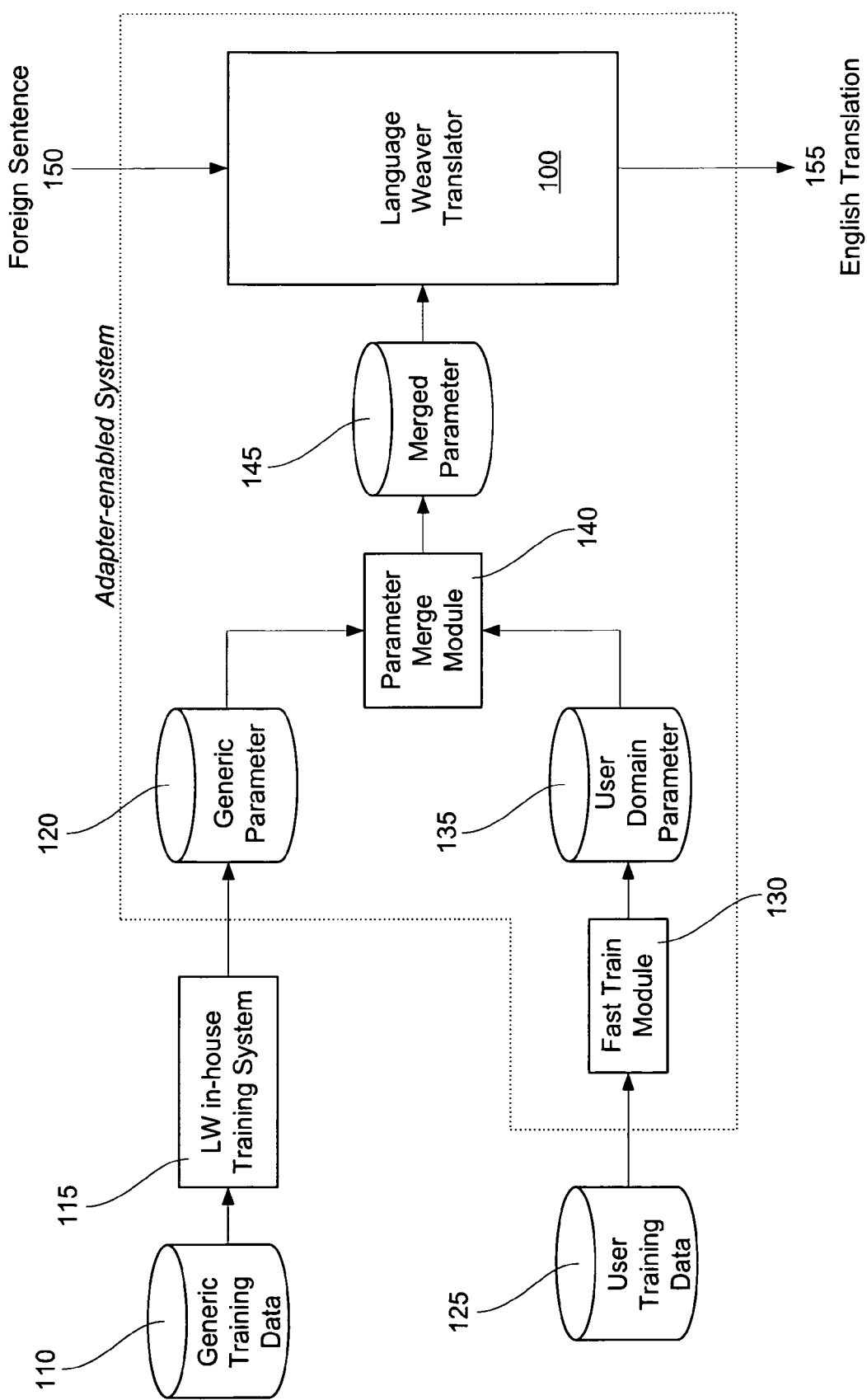
FIG. 1 shows a hardware block diagram of an embodiment.

The general structure and techniques, and more specific embodiments which can be used to effect different ways of carrying out the more general goals are described herein.

Under the current system, a generic training is first carried out, and customers may also provide their specific training material. The software build is then customized to the training information. This may customize the software to work better than the generic translation software. However, it was noticed that customers often have data that they do not want to disclose. The data may be proprietary data, or may be classified data. For example, a military customer may have classified data which is available in both languages and could be used as very powerful specific training information. However, security restrictions may not allow that data to leave the customer's control.

According to an embodiment, a generic translation system is provided, which allows system adaptation on the customer's machine which is already running the pre-trained generic translation software. Alternately, the adaptation can be done at the same location as the generic training, to create an adapted parameter set that can be used for a text-to-text operation.

An embodiment is shown in FIG. 1. Generic training data 110 is used by the translator developer 115 to produce a set of generic parameters 120. The sources may be parallel corpora of multiple language information. Specifically, the sources may include translation memories, probabilistic and non-probabilistic word- and phrase-based dictionaries, glossaries, Internet information, parallel corpora in multiple languages, non-parallel corpora in multiple languages having similar subject matter, and human-created translations. The developer, at 115, can use a very rigorous system of learning from the generic training data. This may be a relatively time consuming process. As an example, the generic system may use a 100 million word database, and might take from one to four weeks to process the contents of the database.

The data information is also supplemented with user training data shown as 125. The user training data is optimized for use in the specific translation field, and hence is domain specific. The fast training module 130 processes this data. The fast training module 130 may use a different training technique then the in-house training system, and one which is optimized for speed as compared with accuracy. The user training data may include fewer words than the generic training data. The user training data may be between ½ million and 5 million words. The user training system may train 2-10 times faster than the in-house training system 115.

The user training creates the user domain specific parameter base 135.

The parameters are merged using a merge module 140 which creates a merged parameter base 145 that includes information from both generic training data 110 and the user training data 125. The merged parameter base is then used by the text to text application 100, which may be a general purpose computer or processor that is programmed for a text-to-text application, such as translation. A foreign language sentence 150 is input into the translator 100 and converted to an English-language translation 155 or vice versa. The translation is based on both sets of parameter databases 120 and 135.

The system used herein is called an adapter, and relies on two different kinds of adaptation, the so-called off-line adaptation at 115 which uses generic training data, and the online adaptation at 130 which adapts the generic data to the specific environment. The online adaptation uses a fast and light weight word alignment model, similar to the models that are used in real-time speech recognition systems. The online adaptation is then merged with the generic system parameters using a set of mathematical formula that allow for effective parameter merge. The formula calculates approximated parameter values as if they would have been trained if all training with both databases had been trained using the off-line adaptation scheme. This avoids complete retraining of the parameters from generic data, and may speed up the adaptation process.

A previous solution to the issue of a general corpus and a domain corpus, combined the two corpora and completely retrained the system. This was typically done "offline", since it was a relatively time consuming process. Moreover, this requires disclosure of the user's data, which, as described above, could not always be done. The table merge described herein makes this system more able to operate in the off-line/online model.

The merged parameters 145 are used for the translator 100.

The Parameter Merge Module 140 combines parameters from the generic model 115 and the domain model 130. Each model is trained separately. A generic parameter is trained only from the generic data. This training is done at the developer, and may take more than two weeks, since the training data is large (over 100 million words). User domain parameter is trained only from user data, which is typically small (less than 1 million words). As two models are trained separately, the adaptation process is quite fast, since only the user parameters need to be trained.

If more computational resources are spent the adaptation, then one way of processing is to combine the generic data and user data, and to run the full training from scratch. It may also-be important to duplicate the user data multiple times so that the user data makes a significant effect on the model. As the data size is quite different (typically, generic data is about 100 million words, and user data is less than 1 million words), such user data duplication may be important. This method (combining the generic and the user data, and training an adaptor from scratch) is called offline adaptation.

The Basic Merge Formula

The following formulas are used for online adaptation.

For a conditional model P(e|f), two models $P_g$(e|f) and $P_d$(e|f) are merged as follows:

$$P(e \mid f) = \lambda_f^K \cdot P_g(e \mid f) + (1 - \lambda_f^K) \cdot P_d(e \mid f) \quad (1)$$

$$\text{where } \lambda_f^K = \frac{C_g(f)}{C_g(f) + K \cdot C_d(f)} \quad (2)$$

The formula combines a generic model $P_g$(e|f) and a domain model $P_d$(e|f) by a linear mixture weight $\lambda_f^K$. However, the different mixture weight is assigned for different model conditioning variable f. The weight is defined by the count of f in the general corpus $C_g$(f) and in the domain corpus $C_d$(f). The domain weight factor $_K$ is a global constant for all f.

Intuitively, the mixture weight is adjusted according to the word frequencies. If a word f in a generic data, but only observed infrequently in the domain data, the probability P(e|f) should stay the same as or similar to $P_g$(e|f). On the other hand, if a word f is observed very frequently in domain data, then P(e|f) should be close to $P_d$(e|f).

Derivation

This section shows that the formula actually emulates the domain duplication effect. A bigram language model is used as an example here. Notice that the adapter formula is applicable for any conditional model, such as a model-1 translation model and an ngram language model or any other model.

Consider, for example, two bigram language models, $P_g(w_2|w_1)$ and $P_d(w_2|w_1)$, that are separately trained from general data and from domain data.

$$P_g(w_2 \mid w_1) = \frac{C_g(w_1 w_2)}{C_g(w_1)} \text{ and } P_d(w_2 \mid w_1) = \frac{C_d(w_1 w_2)}{C_d(w_1)} \quad (3)$$

where $C_g$(w) and $C_d$(w) are the number of occurrences of w in the general data and in the domain data, respectively.

When the domain data is duplicated by $_K$ times and concatenated with the general data, and a single language model is trained with this data, such language model $P_{g+Kd}(w_2|w_1)$ is:

$$P_{g+Kd}(w_1 w_2) = \frac{C_g(w_1 w_2) + K \cdot C_d(w_1 w_2)}{C_g(w_1) + K \cdot C_d(w_1)} \quad (4)$$

$$= \frac{C_g(w_1 w_2)}{C_g(w_1) + K \cdot C_d(w_1)} + \frac{K \cdot C_d(w_1 w_2)}{C_g(w_1) + K \cdot C_d(w_1)} \quad (5)$$

By introducing duplicated term weights $\lambda_{w_l}^K$ where $$\lambda_{w_1}^K = \frac{C_g(w_1)}{C_g(w_1) + K \cdot C_d(w_1)} \quad (6)$$

$$1 - \lambda_{w_1}^K = \frac{K \cdot C_d(w_1)}{C_g(w_1) + K \cdot C_d(w_1)} \quad (7)$$

the domain duplicated language model becomes $$P_{g+Kd}(w_2 \mid w_1) = \lambda_{w_1}^K \cdot \frac{C_g(w_1 w_2)}{C_g(w_1)} + (1 - \lambda_{w_1}^K) \cdot \frac{K \cdot C_d(w_1 w_2)}{K \cdot C_d(w_1)} \quad (8)$$

$$= \lambda_{w_1}^K \cdot P_g(w_2 \mid w_1) + (1 - \lambda_{w_1}^K) \cdot P_d(w_2 \mid w_1) \quad (9)$$

The last line shows that combining two separate language models $P_g(w_2|w_1)$ and $P_d(w_2|w_1)$ with duplicated term weights $\lambda_{w_l}^K$ is equivalent to a single language model $P_{g+Kd}(w_2|w_1)$, trained from a concatenated training data with domain data duplication $_K$ times.

Formula Application

The model parameter for this translation system may be formed of several different types of parameters. The adaptation formula above is modified differently according to the different types of parameters.

Word Probability Parameters

The formula above is directly applicable to parameters that are in the form of probabilities conditioned on a single word.

As seen in the formula (1), a merged entry P(e|f) is independent from the domain data if its probability $P_d$(e|f) is zero, that is $$P(e|f) = \lambda_f^K \cdot P_g(e|f) \text{ if } P_d(e|f) = 0 \quad (10)$$

This happens when the words e and f do no co-occur in any sentence in the domain corpus.

Therefore, an efficient implementation is the following:

$$P(e \mid f) = \begin{cases} P_{ov}(e \mid f) & \text{if } C_d(e, f) \neq 0, \\ w_f \cdot P_g(e \mid f) \end{cases} \quad (11)$$

otherwise, where $$P_{ov}(e|f) = \lambda_f^K \cdot P_g(e|f) + (1 - \lambda_f^K) \cdot P_d(e|f) \quad (12)$$

And $C_d$(e|f) is the number of sentences (in the domain corpus) in which both e and f appear. The size of the override table $P_{ov}$(e|f) is identical to the word probability table from the domain corpus.

The override table is generated by the formula (12) at the end of the adaptation process. In the adapted version of the decoder, the override table is used in conjunction with the original generic word probability table $P_g$(e|f) as specified in the formula (11).

The following is a sample implementation of formula (11) and (12):

```
# TO GENERATE OVERRIDE TABLE
PROCEDURE GENERATEOVERRIDEWPTABLE(GENERICWPTABLE,DOMAINWPTABLE,GENCNT,DOMCNT,K)
:==
    FOR EACH (E,F) IN DOMAINWPTABLE(E,F)
        W = GENCNT(F) / (GENCNT(F) + K * DOMCNT(F))
        OVERRIDEWPTABLE(E,F) = W * GENERICWPTABLE(E,F) + (1-W) *
DOMAINWPTABLE (E,F)
# TO USE IN THE DECODER
FUNCTION GETWPVALUE(E,F,GENERICWPTABLE,OVERRIDEWPTABLE,GENCNT,DOMCNT,K) :==
    IF (E,F) IS FOUND IN THE OVERRIDEWPTABLE(E,F)
    THEN
        RETURN OVERRIDEWPTABLE(E,F)
    ELSE
        W = GENCNT(F) / (GENCNT(F) + K * DOMCNT(F))
        RETURN W * GENERICWPTABLE(E,F)
```

The OverrideWPTable(e,f) is maybe a fixed-sized array. Each element stores the precomputed value of formula (12). The size of the OverrideWPTable(e,f) is identical to the size of the word probability table from the domain corpus. The weight term W=GenCnt(f)/(GenCnt(f)+K*ComCnt(f)) implements the formula (2).

Phrase Probability Parameters

A simple application is possible to the parameters that in the form of probabilities conditioned on a sequence of words, or a phrase:

$$P(eee \mid fff) = \lambda_{fff}^K \cdot P_g(eee \mid fff) + (1 - \lambda_{fff}^K) \cdot P_d(eee \mid fff) \quad (13)$$

where $$\lambda_{fff}^K = \frac{c_g(fff)}{C_g(fff) +_K \cdot C_d(fff)} \quad (14)$$

and $C_g(fff)$ and $C_d(fff)$ are the number of occurrences of phrase fff in the general corpus and the domain corpus. These phrase counts one provided from the generic data, in addition to the generic model parameters. If these phrase counts cannot be provided they can, further approximated by assuming that the counts are uniform u over the all possible phrases.

$$\lambda_{fff}^K = \frac{u}{u +_K \cdot u} = \frac{1}{1 +_K} \quad (15)$$

This turns out to be a linear model mixture in which the weight is determined by the domain corpus duplication factor $_K$.

$$P(eee \mid fff) = \frac{1}{1 +_K} \cdot P_g(eee \mid fff) + \frac{K}{1 +_K} \cdot P_d(eee \mid fff) \quad (16)$$

A similar approach for word probability parameters can be implemented as:

$$P(eee \mid fff) = \begin{cases} P_{ov}(eee \mid fff) \\ \frac{1}{1 +_K} \cdot P_g(eee \mid fff) & \text{if } C_d(eee \mid fff) \neq 0 \end{cases} \quad (17)$$

otherwise, where $$P_{ov}(eee \mid fff) = \frac{1}{1 +_K} \cdot P_g(eee \mid fff) + \frac{K}{1 +_K} \cdot P_d(eee \mid fff) \quad (18)$$

The following is a exemplary sample implementation of formula (17) and (18):

```
# TO GENERATE OVERRIDE TABLE
PROCEDURE GENERATEOVERRIDEPHTABLE(GENERICPHTABLE,DOMAINPHTABLE,K) :==
    FOR EACH (EEE,FFF) IN THE DOMAINPHTABLE
        OVERRIDEPHTABLE(EEE,FFF) =
            (1/(1+K)) * GENERICPHTABLE(EEE,FFF)
            + (K/(1_K)) * DOMAINPHTABLE(EEE,FFF)
# TO USE IN THE DECODER
FUNCTION GETPHVALUE(EEE,FF,GENERICPHTABLE,OVERRIDEPHTABLE,K) :==
    IF (EEE,FFF) IS FOUND IN THE OVERRIDEPHTABLE
    THEN
        RETURN OVERRIDEPHTABLE(EEE,FFF)
    ELSE
        RETURN GENERICPHTABLE(EEE,FFF) / (1+K)
```

The OverridePHTable is identical to the one from the domain corpus, except that each entry is replaced with the override value.

2.3.3 Count-Based Parameters

Some model parameters are not in the form of probabilities, but rather are in the form of simple counts. For this type of parameter, the basic formula (1) cannot be applied. Instead, the following formula is applied to have the same effect.

$$C(e,f) = C_g(e,f) + K \cdot C_d(e,f) \qquad (19)$$

An efficient implementation is the following:

$$C(e,f) = \begin{cases} C_{ov}(e,f) & \text{if } C_d(e,f) \neq 0 \\ C_g(e,f) & \end{cases} \qquad (20)$$

otherwise, where $$C_{ov}(e,f) = C_g(e,f) + K \cdot C_d(e,f) \qquad (21)$$

The override table $C_{ov}(e,f)$ is generated by the formula (21) at the end of the adaptation process. In the adapted version of the decoder, the override lexicon table is used in conjunction with the original generic table $C_g(e,f)$ as specified in formula (20).

The following is an exemplary implementation of formula (20) and (21):

```
# TO GENERATE OVERRIDE TABLE
PROCEDURE GENERATECTABLE(GENERICCTABLE,DOMAINCTABLE,K) :==
    FOR EACH (E,F) IN THE DOMAINCTABLE(E,F)
        OVERRIDECTABLE(E,F) = GENERICCTABLE(E,F) + K * DOMAINCTABLE(E,F)
# TO USE IN THE DECODER
FUNCTION GETCVALUE(E,F,GENERICCTABLE,OVERRIDECTABLE,K) :==
    IF (E,F) IS FOUND IN THE OVERRIDECTABLE(E,F)
    THEN
        RETURN OVERRIDECTABLE(E,F)
    ELSE
        RETURN GENERICCTABLE(E,F)
```

The OverrideCTable(e,f) is a fixed-sized array. Each element stores the precomputed value of formula (21). The size of the OverrideCTable(e,f) may be identical to the size of the parameter table from the domain corpus.

Fast Train Module

The Fast Train Module uses a simpler version of the in-house Training System. It may use simple models such as bag-of-words translation models, and/or Hidden Markov models.

Simple Fast Training

The simplest form of the Fast Train Module is just to use such simple models without any additional data from the generic parameters. If the user data is sufficiently large, this scheme works well in practice.

Adaptive Fast Training

To improve the adaptation performance, especially for small user data, the generic parameters are additionally used to train the user data. In general, the training method builds a word-based conditional probability table based on the following formula:

$$P^n(e|f) = \frac{c^{n-1}(e,f)}{\sum_e c^{n-1}(e,f)} \qquad (22)$$

Where $c^n(e,f)$ is the alignment count from the parameters at the n-th iteration.

Seed Adaptation

In non-adapter systems, the initial parameter $P^0(e|f)$ is usually a uniform parameter. In the adapter environment, the generic parameter $P_g(e|f)$ can be used instead.

Use Alignment Counts from General Corpus

If the generic parameter provides the final alignment counts $c_g^N(e,f)$ from the general corpus, it can be used in each iteration of the user data training in the following way:

$$P^n(e|f) = \frac{\lambda_f^K \cdot c_g^N(e,f) + (1-\lambda_f^K) \cdot c_d^{n-1}(e,f)}{\sum_e \{\lambda_f^K \cdot c_g^N(e,f) + (1-\lambda_f^K) \cdot c_d^{n-1}(e,f)\}} \qquad (23)$$

Use Generic Model for Each Iteration

Instead of using $c_g^N(e,f)$, the generic model table $P_g(e|f)$ can be used in each iteration.

$$P^n(e|f) = \lambda \cdot P_g(e|f) + (1-\lambda) \cdot \frac{c^{n-1}(e,f)}{\sum_e c^{n-1}(e,f)} \qquad (24)$$

In this formula, a constant weight $\lambda$ can be used.

Term Weighted Adaptation

The adaptation formula (1) can alternatively be used as:

$$P^n(e|f) = \lambda_f^K \cdot P_g(e|f) + (1-\lambda_f^K) \cdot \frac{c^{n-1}(e,f)}{\sum_e c^{n-1}(e,f)} \qquad (25)$$

Use Prior Count Instead of Alignment Count

The alignment count $c_g^N(e,f)$, from the general corpus can be approximated using the term frequency count $C_g(e)$.

$$c_g^N(e,f) \approx C_g(f) \cdot P_g(e|f) \qquad (26)$$

The operations described herein can be carried out on any computer, e.g., an Intel processor, running Windows and/or Java. Programming may be done in any suitable programming language, including C and Java.

In one embodiment, a method may comprise first carrying out a first training using at least one corpus of language information, using a first training operation to obtain a first parameter set; second carrying out a second training using a domain specific corpus, using a second training operation which operates faster than said first training operation, and which is less accurate than said first training operation, to obtain a second parameter set; and using said second parameter set to adapt said first parameter set to carry out a text-to-text operation. In another embodiment, said first carrying out may be carried out at a first location, and said second carrying out may be carried out at a second location, different than said first location.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, other merging and training techniques may be used.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A computer implemented method, comprising:
    first carrying out a first generic training using at least one corpus of language information based at least in part on Internet information, using a first generic training operation to obtain a first generic parameter set;
    second carrying out a second domain specific training using a fast train module associated with a domain specific corpus, said fast train module including a second domain specific training operation which operates faster than said first generic training operation, and which is less accurate than said first generic training operation, to obtain a second domain specific parameter set;
    merging said first generic parameter set and said second domain specific parameter set into a merged parameter set, and using said merged parameter set for a text to text operation, wherein said merging comprises a weighted merge between said first generic parameter set and said second domain specific parameter set; and
    using said second domain specific parameter set to adapt said first generic parameter set to carry out said to text operation, wherein said using comprises using partial information from the first generic training and partial information from the second domain specific training, forming an original table and an override table, and using both said original table and said override table as part of said text to text operation.

2. A computer implemented method as in claim 1, wherein said text to text operation is a translation between first and second languages.

3. A computer implemented method as in claim 1, wherein said merging comprises an adaptive training merge between said first generic parameter set and said second domain specific parameter set.

4. A computer implemented method as in claim 1, wherein said weighted merge is sensitive to frequency of specified terms in the corpus.

5. A computer implemented method as in claim 1, wherein said second domain specific training operation uses parameters from said first generic training operation.

6. A computer implemented method as in claim 5, wherein said second domain specific training operation uses a basic seed probability from the first generic training operation.

7. A computer implemented method as in claim 1, wherein said merging uses an adaptive merging.

8. A computer implemented method as in claim 7, wherein said adaptive merging uses a merge which is proportional to a frequency of a specified term in a training database.

9. A computer implemented method as in claim 1, wherein said merging comprises adding indications of counts.

10. A computer implemented method as in claim 1, wherein said merging comprises adding information that represent counts related to alignment.

11. A computer implemented method as in claim 1, wherein said first carrying out is carried out at a first location, and said second carrying out is carried out at a second location, different than said first location.

12. A computer implemented method as in claim 1, wherein the override table includes precomputed versions of specified formulas.

13. A computer implemented method as in claim 1, wherein the partial information includes probabilities.

14. A computer implemented method as in claim 1, wherein the partial information includes counts.

15. An apparatus, comprising:
    a first training computer at a first location, carrying out a first generic training using at least one corpus of information based at least in part on Internet information, using a first generic training operation to obtain a first generic parameter set; and
    a second training computer, at a second location, different than the first location, carrying out a second domain specific training using a fast train module associated with a domain specific corpus that has different information than said at least one corpus, said fast train module including a second domain specific training operation which operates faster than said first generic training operation, and which is less accurate than said first generic training operation, to obtain a second domain specific parameter set, and using said first generic parameter set and said second domain specific parameter set together for a text to text operation,
    wherein said second training computer also operates to merge said first generic parameter set and said second domain specific parameter set into a merged parameter set, to use said merged parameter set for said text to text operation, and to carry out a weighted merge between said first generic parameter set and said second domain specific parameter set, and
    wherein said training second computer uses partial information from the first generic training and partial information from the second domain specific training, forms an original table and an override table, and uses both said original table and said override table as part of said text to text operation.

16. An apparatus as in claim 15, wherein said text to text operation is a translation between first and second languages.

17. An apparatus as in claim 15, wherein said second training computer carries out an adaptive training merge between said first generic parameter set and said second domain specific parameter set.

18. An apparatus as in claim 15, wherein said override table represents information which is present in both the at least one corpus and the domain specific corpus.

19. An apparatus as in claim 15, wherein the override table includes precomputed versions of specified formulas.

20. An apparatus as in claim 15, wherein the partial information includes probabilities.

21. An apparatus, comprising:

a training part including at least one computer, which carries out a first generic training for a text to text operation using at least one corpus of training information based at least in part on Internet information, to obtain a first generic parameter set and at a different time than first generic training, carrying out a second domain specific training using a fast train module associated with a domain specific corpus that has different information than said at least one corpus, said fast train module including a second domain specific training operation which operates faster than said first generic training operation, and which is less accurate than said first generic training operation, to obtain a second domain specific parameter set and using said second domain specific parameter set to adapt said first generic parameter set to create an adapted parameter set, and to use the adapted parameter set for a text to text operation, wherein said at least one training computer merges said first generic parameter set and said second domain specific parameter set into a merged parameter set, and uses said merged parameter set for said text to text operation, and carries out a weighted merge between said first generic parameter set and said second domain specific parameter set, and wherein said at least one training computer uses partial information from the first generic training and partial information from the second domain specific training, forms an original table and an override table, and uses both said original table and said override table as part of said text to text operation.

22. An apparatus as in claim 21, wherein said text to text operation is a translation between first and second languages.

23. An apparatus as in claim 21, wherein said training computer carries out an adaptive training merge between the first generic parameter set and said second domain specific parameter set.

24. An apparatus as in claim 21, wherein said weighted merge is sensitive to frequency of specified terms in the corpus.

* * * * *